United States Patent [19]

Brewster et al.

[11] 4,143,414

[45] Mar. 6, 1979

[54] THREE PHASE AC TO DC VOLTAGE CONVERTER WITH POWER LINE HARMONIC CURRENT REDUCTION

[75] Inventors: Roger F. Brewster; Alfred H. Barrett, both of Santa Barbara, Calif.

[73] Assignee: General Motors Corporation, Detroit, Mich.

[21] Appl. No.: 894,739

[22] Filed: Apr. 10, 1978

[51] Int. Cl.² .................. H02M 1/12; H02M 1/14
[52] U.S. Cl. .............................. 363/44; 363/27; 363/65; 363/87; 363/129
[58] Field of Search ............... 363/27, 44, 65, 71, 363/128, 87, 129

[56] References Cited

U.S. PATENT DOCUMENTS

| | | | |
|---|---|---|---|
| 3,746,967 | 7/1973 | Koltuniak et al. | 363/87 X |
| 3,845,374 | 10/1974 | Clarady et al. | 363/87 X |
| 3,852,655 | 12/1974 | Justice | 363/71 X |
| 4,062,057 | 12/1977 | Perkins et al. | 363/71 |

Primary Examiner—William M. Shoop
Attorney, Agent, or Firm—Howard N. Conkey

[57] ABSTRACT

A three phase AC to DC voltage converter includes separate single phase AC to DC converters for each phase of a three phase source with the DC voltage output of the three converters paralleled and controlled to provide necessary regulation. Each of the single phase AC to DC converters includes a full-wave bridge rectifier feeding a substantially resistive load including an inverter and a second single phase full-wave bridge rectifier. To the extent that each inverter and second single phase full-wave bridge rectifier approximate a resistive load, the source current harmonics are reduced. Additionally, the triplen harmonics produced in the three phase source lines by each of the three AC to DC converters are cancelled by the triplen harmonics produced in the three phase source lines by the remaining two AC to DC converters.

2 Claims, 1 Drawing Figure

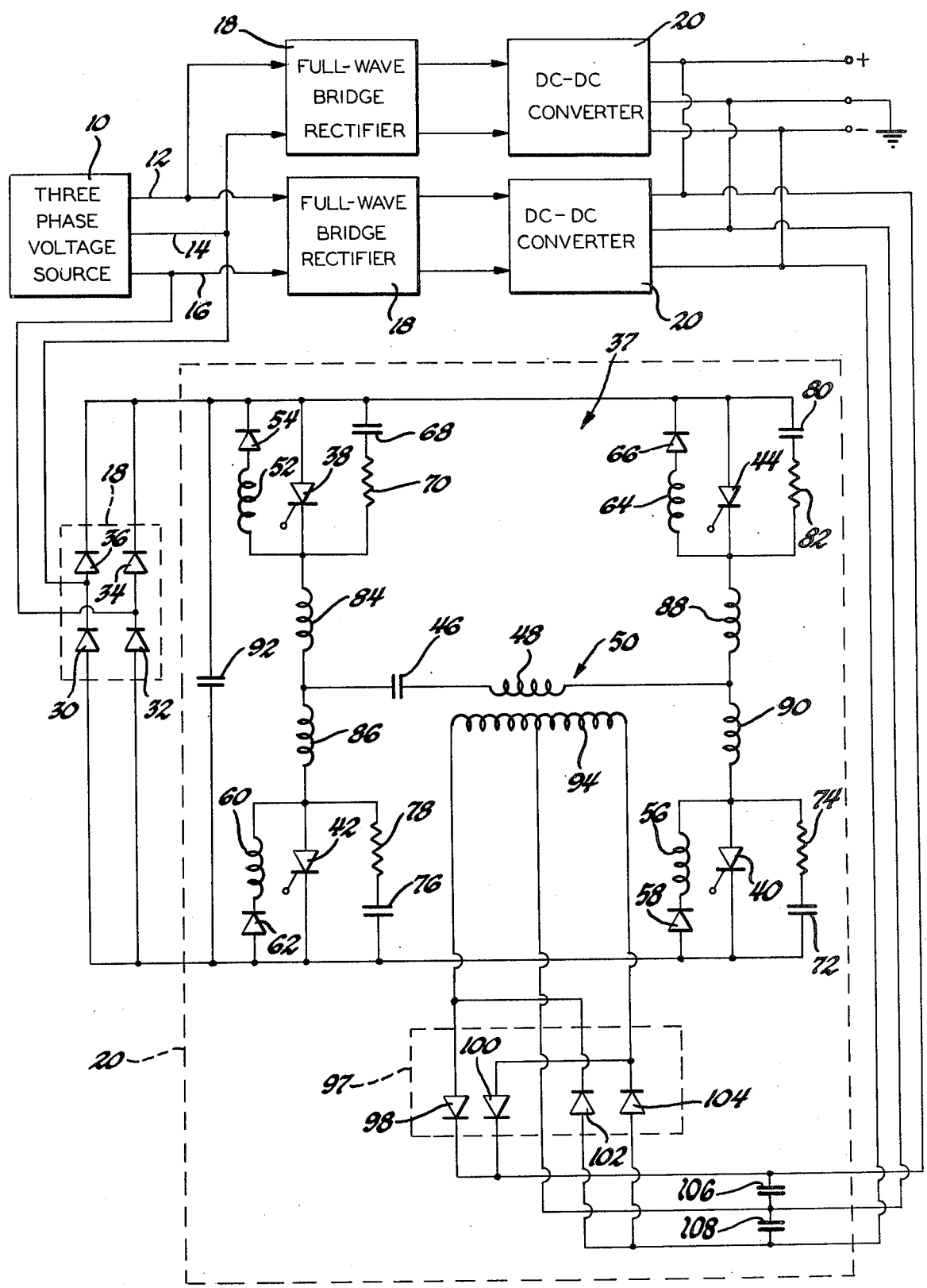

THREE PHASE AC TO DC VOLTAGE CONVERTER WITH POWER LINE HARMONIC CURRENT REDUCTION

This invention relates to AC to DC power converters and more particularly to a three phase AC to DC converter having reduced source line current harmonics.

Three phase input AC to DC converters are widely used in both commercial and military applications and particularly in high power applications. In a large number of applications, the DC output voltage of the converter is self-regulated through the use of phase-angle control in the rectification process or the use of DC choppers following rectification.

Generally, all forms of AC to DC converters act as nonlinear loads when operating from an AC power system. Non-linear loads generate harmonic currents which are fed back to the AC power distribution system where they create voltage drops across source impedances and line inductances which in turn produce distortions of the voltage waveforms in the distribution or transmission lines of the network. The voltage distortions which result not only can cause faulty performance of sensitive electronic systems on the power lines, but can also produce system shutdown and possible destruction. It is therefore desirable to provide converters which are essentially current harmonic free if voltage transients and waveform distortions are to be controlled and eliminated on power distribution networks.

The bridge converter is generally the basic unit of any three phase AC to DC converter system. However, all basic converter circuits characteristically produce unacceptably large magnitude current harmonics on the three phase AC power input lines. A number of solutions have been proposed for reducing the power line harmonic currents in the three phase source in an AC to DC converter. One such solution is the use of series-resonant filters that are commonly connected to the three-phase AC input terminals of a three phase bridge rectifier in order to supply a shunt path for the harmonic currents. However, these AC line filters are, in general, large and not completely effective.

Another proposed solution is the use of multiphase rectification wherein transformers having stub windings on the secondary increase the number of phases of the three phase input power source in odd multiples of three phases. The resulting output signal is full-wave rectified resulting in a DC voltage having a relatively low power line harmonic. However, this solution requires substantially increased transformer weight and volume because of the required increase in the volt ampere capacity of the secondary windings.

Additional solutions have been proposed. However, they are generally not completely effective in the reduction of the power line harmonic current to acceptable levels and further are generally heavy and occupy a large volume.

It is the general object of this invention to provide for an improved three phase AC to DC voltage converter.

It is another object of this invention to provide for a three phase AC to DC voltage converter producing reduced power source line harmonic currents.

It is another object of this invention to provide for a three phase AC to DC voltage converter producing a low level of power source harmonic currents generally associated with a single phase, full-wave rectifier with a resistive load.

It is another object of this invention to provide for a three phase AC to DC voltage converter employing separate single phase AC to DC converters for each phase of the three phase source and wherein the resulting triplen harmonics produced in the three phase source lines are cancelled resulting in a reduced level of source current harmonics.

These and other objects of this invention are generally achieved in the following description of a preferred embodiment in which a separate single phase AC to DC converter is employed for each phase of a three phase input voltage source. Each of the single phase AC to DC converters employs a full-wave bridge rectifier feeding a substantially resistive inverter and rectifier combination thereby reducing the source harmonics produced by the AC to DC converter to the extent the inverter and rectifier combination approximate a resistive load. The output of each of the single phase AC to DC converters are parallel coupled to produce the three phase AC to DC output voltage which is regulated by controlled operation of the inverter. The triplen harmonics produced in the three phase source lines by each of the single phase AC to DC converters are cancelled by the triplen harmonics produced in the source lines by the other two AC to DC converters to further reduce the total harmonic currents produced in the three phase AC source.

The invention may be best understood by reference to the following description of a preferred embodiment and the drawing which is a schematic partially in block form and partially in circuit form illustrating the principles of this invention.

Referring to the drawing, the output of a three phase voltage source 10 supplies a three phase AC voltage on the output lines 12, 14 and 16. In accord with the present invention, a separate AC to DC converter is provided for each phase of the three phase source voltage with the DC voltage output of the three converters being parallelled and controlled to provide necessary DC voltage or current regulation.

Each of the AC to DC converters are identical and is comprised of a single phase full-wave bridge rectifier 18 followed by a DC to DC converter 20. To the extent that the DC to DC converters 20 approximate resistive loads to the full-wave bridge rectifiers 18, the current harmonics produced in the supply lines of the three phase voltage source 10 are reduced. This results since a single phase, full-wave bridge rectifier supplying an ideal, purely resistive load produces no harmonic distortion in the single-phase source supply. Consequently, the DC to DC converters 20 are preferably made to present as nearly as possible a resistive load so that the current harmonics produced by the AC to DC converters in the respective output phase of the three phase voltage source 10 are minimized.

In general, if each of the DC to DC converters 20 is comprised of a chopper followed by a rectifier circuit, at least as a first approximation the converters 20 each present a resistive load to the respective full-wave bridge rectifier 18 thereby substantially reducing the harmonic line currents produced in the supply lines 12, 14 and 16. However, to the extent that the DC to DC converters 20 are nonlinear and do not present an ideally resistive load to the full-wave bridge rectifiers 18, current harmonics are generated in each phase of the three phase voltage source 10. Included in the harmonic currents generated in each phase of the three phase source 10 are triplen harmonics (3N times the fundamental frequency, where N is an integer). However, all of the triplen harmonics produced in any one phase of the three phase voltage source 10 by one of the AC to DC converters are completely cancelled by the triplen harmonics produced in the remaining two phases by the other two AC to DC converters since the system is a balanced three phase system. This results in a substantial reduction of the harmonic distortion that resulted from non-ideal full-wave rectifiers 18 and nonlinear loads presented thereto by the DC to DC converters 20.

While the single phase AC to DC converters of the drawing may take many known forms, one specific embodiment is illustrated. As previously indicated, the three single phase AC to DC converters are identical. Consequently only one is illustrated in detail.

Each of the single phase voltages across the lines 12–14, 14–16 and 12–16 are coupled to the input of one of the full-wave bridge rectifiers 18 which is comprised of the diodes 30, 32, 34 and 36 coupled as illustrated to provide a full-wave rectified voltage. The output of the full wave bridge rectifier 18 is coupled to the input of a resonant sine wave inverter 37 in the DC to DC converter 20 which provides a controlled AC voltage at the inverter operating frequency.

The resonant sine wave inverter is generally comprised of four controlled rectifiers 38, 40, 42 and 44 coupled in bridge fashion and the associated circuitry.

A capacitor 46 is series coupled with the primary winding 48 of an isolation transformer 50 and resonates with the inductance of the isolation transformer 50. The resonant circuit is driven by the alternate gating of the control rectifier pairs 38,40 and 42,44 by conventional bridge inverter driving circuits. The controlled rectifier 38 is commutated by the current through an inductor 52 and a diode 54 and the controlled rectifier 40 is commutated by the current through an inductor 56 and a diode 58 when the current through the resonant circuit including the capacitor 46 reverses after the controlled rectifiers 38 and 40 are gated conductive.

Similarly, the controlled rectifiers 42 and 44 are commutated after being gated conductive during the other half cycle of inverter operation when the current through the resonant circuit including the capacitor 46 reverses and flows through an inductor 60 and a diode 62 parallel coupled with the controlled rectifier 42 and an inductor 64 and a diode 66 parallel coupled with the controlled rectifier 44.

The series circuits comprised of a capacitor 68 and a resistor 70, a capacitor 72 and a resistor 74, a capacitor 76 and a resistor 78, and a capacitor 80 and a resistor 82 are parallel coupled with the respective controlled rectifiers 38 through 44 and function as snubbers to reduce the reapplied rate of change of the voltage. The inductors 84, 86, 88 and 90 function to aid the snubber action and further to limit the rate of change of current and reduce the turn on losses. A capacitor 92 is coupled across the input of the inverter to prevent resonant inverter high frequency currents from being reflected into the source 10.

The AC voltage output of the inverter 37 is provided across the secondary winding 94 of the isolation transformer 50 and is coupled to a full-wave bridge inverter 97 comprised of the diodes 98, 100, 102 and 104 which converts the AC voltage output of the inverter 37 to a DC voltage.

Output filter capacitors 106 and 108 are required to filter out harmonics of the three phase voltage source 10 as well as high frequency components produced by the resonant inverter 37 thus providing a ripple-free DC voltage output.

The DC voltage output of the full-wave bridge rectifier 97 has a positive and negative value relative to the grounded center tap of the secondary winding 94 of the isolation transformer 50. The magnitude of the voltage output of the DC to DC converter 20 is regulated by varying the frequency at which the controlled rectifier pairs 38,40 and 42,44 are alternately biased conductive. By monitoring the voltage and/or current output of the DC to DC converter 20 and controlling the frequency that the controlled rectifier pairs are energized, each of the DC voltage outputs of the AC to DC converters may be regulated. The control of the inverter 37 in each of the DC to DC converters 20 is conventional in form and may take the form of a voltage controlled oscillator that establishes the frequency that the controlled rectifier pairs 38, 40 and 42,44 are alternately energized in response to the system DC output to provide regulation.

The resonant sine wave inverter illustrated in the drawing was found to generally approximate a resistive load for the full-wave bridge rectifiers 18. The output of a three phase AC to DC converter utilizing the DC to DC converter 20 illustrated in the drawing reduced the total harmonic current distortion produced on the power output lines of the three phase voltage source 10 at a load of 6 kw to approximately 6% total harmonic distortion.

While various configurations may be utilized, the provision of a separate single-phase AC to DC converter for each phase of the output of the three phase source provides for cancellation of the triplen harmonics and further to the extent that the DC to DC converter presents a resistive load to the full-wave bridge rectifier, the total harmonic distortion produced in the input three phase power lines are reduced.

The foregoing embodiment of the invention for the purpose of illustrating the principles of the invention is not to be considered as limiting or restricting the invention since many modifications may be made by one skilled in the art without departing from the scope of the invention.

The embodiments of the invention in which an exclusive property or privilege is claimed are defined as follows:

1. A three phase AC to DC voltage converter characterized by its low production of source current harmonics comprising, in combination:
   a three phase AC voltage source;
   first, second and third single phase AC to DC voltage converters, each of said single phase AC to DC voltage converters including:
   a first full-wave bridge rectifier effective to convert a respective one of the phases of the three phase voltage source to a first full-wave rectified DC voltage,
   an inverter effective to invert the first full-wave rectified DC voltage to an AC voltage, and
   a second single phase, full-wave bridge rectifier effective to convert the AC voltage output of the inverter to a second full-wave rectified DC voltage, said inverter and second single phase full-wave bridge rectifier being characterized in that their operation produces harmonic currents including triplen harmonic currents in the respective phase of the three-phase AC voltage source; and means effective to couple the second full-wave rectified DC voltages from the first, second and third single phase AC to DC voltage converters in parallel to provide an output DC voltage for the three phase AC to DC voltage converter, wherein the triplen current harmonics produced in each phase of the three-phase AC voltage source by a respective one of the single phase AC to DC voltage converters is cancelled by the triplen current harmonics produced in the other two phases of the three phase AC voltage source by the remaining two AC to DC voltage converters.

2. A three phase AC to DC voltage converter characterized by its low production of source current harmonics comprising, in combination:

a three phase AC voltage source;

first, second and third single phase AC to DC voltage converters, each of said single phase AC to DC voltage converters including:

a first full-wave bridge rectifier effective to convert a respective one of the phases of the three phase voltage source to a first full-wave rectified DC voltage, a sine wave resonant bridge inverter effective to invert the first full-wave rectified DC voltage to an AC voltage, and a second single phase, full-wave bridge rectifier effective to convert the AC voltage output of the sine wave resonant bridge inverter to a second full-wave rectified DC voltage, said sine wave resonant bridge inverter and second single phase full-wave bridge rectifier being characterized in that they approximate a resistive load for the first full-wave bridge rectifier to reduce the total harmonic current distortion produced in the three phase AC voltage source; and means effective to couple the second full-wave rectified DC voltages from the first, second and third single phase AC to DC voltage converters in parallel to provide an output DC voltage for the three phase AC to DC voltage converter, wherein the triplen harmonics produced in each phase of the three phase AC voltage source by a respective one of the single phase AC to DC voltage converters is cancelled by the triplen harmonics produced in the other two phases of the three phase AC voltage source by the remaining two AC to DC voltage converters.

* * * * *